United States Patent [19]

Nicholas

[11] 4,158,107
[45] Jun. 12, 1979

[54] INTEGRAL FRAME SLIP CIRCUIT

[75] Inventor: David C. Nicholas, Cedar Rapids, Iowa

[73] Assignee: Rockwell International Corporation, El Segundo, Calif.

[21] Appl. No.: 871,654

[22] Filed: Jan. 23, 1978

[51] Int. Cl.² .............................................. H04J 3/06
[52] U.S. Cl. ............................ 179/15 AF; 179/15 BS
[58] Field of Search ....................... 179/15 AF, 15 BS

[56] References Cited
U.S. PATENT DOCUMENTS

| 3,867,579 | 2/1975 | Colton et al. | 179/15 A |
| 4,086,437 | 4/1978 | Henrion et al. | 179/15 AF |

Primary Examiner—Thomas A. Robinson
Attorney, Agent, or Firm—Bruce C. Lutz; Howard R. Greenberg; H. Fredrick Hamann

[57] ABSTRACT

The elastic storage circuit disclosed permits insertions and deletions to be made as required without disturbing the operation of a downstream framing circuit by inserting or deleting exactly the amount of data contained in the period of the framing indicator. In particular in certain instances with certain types of framing circuits and certain types of framing indicators the same effect may be accomplished by inserting or deleting a quantity of data equal to one-half the period of the framing indicator. The use of the elastic storage circuit described herein permits the required insertions and deletions to be made in the data without throwing the framing circuit out of frame. Thus only the data actually inserted or deleted is lost and the much longer and more extensive loss of data which occurs during a reframe is avoided.

11 Claims, 10 Drawing Figures

INTEGRAL FRAME SLIP CIRCUIT

THE INVENTION

The present invention pertains generally to communications and more specifically to serial TDM multiplexed communications channels. Even more specifically it relates to a concept for maintaining frame synchronization in receiving equipment while providing an elastic storage circuit which operates without adversely affecting a downstream frame synchronization circuit. An elastic storage circuit is disclosed for use with data signals which have periodically recurring data blocks, often referred to as frames, in which the beginning of the periodically recurring frame is found by examining a data bit or bits which occur at a particular place within the frame, which framing indicator bits reoccur in a periodic way from frame to frame. A circuit, referred to as a framing circuit, searches through the data until the framing indicator bit is located and then remains locked in that position. The elastic storage circuit disclosed is designed to absorb small changes in the frequency of the incoming data and deliver a uniform constant frequency output providing a variable amount of storage for received data. In the event that a large frequency difference occurs between the incoming data and the required uniform rate outgoing data rate, or in the event that a small frequency difference occurs over a long period of time, then the elastic storage mechanism will eventually exceed the amount of storage available in it in the case of arriving data at a high frequency or will exhaust all stored data in the case of data arriving at too low a frequency. In these instances the elastic storage circuit is required to insert or delete data to maintain a uniform output rate. The elastic storage circuit disclosed inserts or deletes at these times the amount of data corresponding to the period of the periodically recurring framing indicator. Thus, a downstream framing detection circuit remains in frame because no difference in the framing indicator is observed. Therefore a reframe search need not occur when a slip occurs. This is desirable because the subjective effect of a reframe search is objectionable to the listener while the slip by itself is almost undetectable.

A particlar embodiment of the invention described operates on a T-carrier, PCM digital voice transmission circuit. One form of this circuit utilizes a periodically recurring frame of data of 193 bits in length. The framing indicator consists of a single bit, normally thought of as the last bit in the frame, which changes from a 1 to a 0 and a 0 to a 1 from frame to frame. Thus the period of the framing indicator is 2 frames (i.e., contains 2 indicator bits) or 386 bits, and the elastic store design which does not disturb a framing circuit designed for this type of T-carrier provides insertions and deletions when necessary of exactly 386 bits. A more sophisticated form of framing circuit may be designed which examines the data in its search for the framing bit for a bit which is different from frame to frame and is tolerant of single errors in these differences. When such a framing circuit is used, the elastic storage circuit described need only delete or insert one frame that is 193 bits, and the second form of framing circuit remains in frame. A second form of T-carrier which is in more general use utilizes a framing indicator which occurs only every two groups of 193 bits and therefore for framing purposes has a frame length of 386 bits. Thus when utilized with this form of T-carrier the elastic stored circuit disclosed must insert or delete two 386 bit frames or 772 bits. When used with the more sophisticated framing circuit of the second type only 386 bits need be inserted or deleted. It is important to understand that the elastic store circuit described inserts or deletes an amount of data equal to the period of the framing indicator at an arbitrary point within the received data stream. In the case of T-carrier this results in the deletion or insertion, usually by repetition of the previous data, of 2 adjacent samples in each voice channel. In addition, the voice channel in which the insertion or deletion occurs will be altered except for one additional sample period. The subjective effect for voice signals of this type of insertion and delection is often not audible to the listener and is always less serious than the subjective effect of the operation of the framing circuit in performing a reframe operation. Thus the use of the elastic store is subjectively desirable.

In summary, the elastic storage circuit disclosed permits insertions and deletions to be made as required without disturbing the operation of a downstream framing circuit by inserting or deleting exactly the amount of data contained in the period of the framing indicator. In particular in certain instances with certain types of framing circuits and certain types of framing indicators the same effect may be accomplished by inserting or deleting a quantity of data equal to one-half the period of the framing indicator. The advantages of the use of such a circuit arise out of the fact that the framing indicator must be located by the framing circuit utilizing a statistical search procedure to identify the framing indicator among the other data in the frame which may from time to time appear similar to the framing indicator. Thus, once the frame synchronization is lost, a fairly large amount of data must pass thru the framing circuit before reframing synchronization is obtained. The use of the elastic storage circuit herein described permits the required insertions and deletions to be made in the data without throwing the framing circuit out of frame. Thus only the data actually inserted or deleted is lost and the much longer and more extensive loss of data which occurs during a reframe is avoided.

It is therefore an object of the present invention to provide an improved elastic store apparatus.

Other objects and advantages of the present invention may be ascertained from the reading of the specification, independent claims in conjunction with the drawings wherein:

Figure 1:
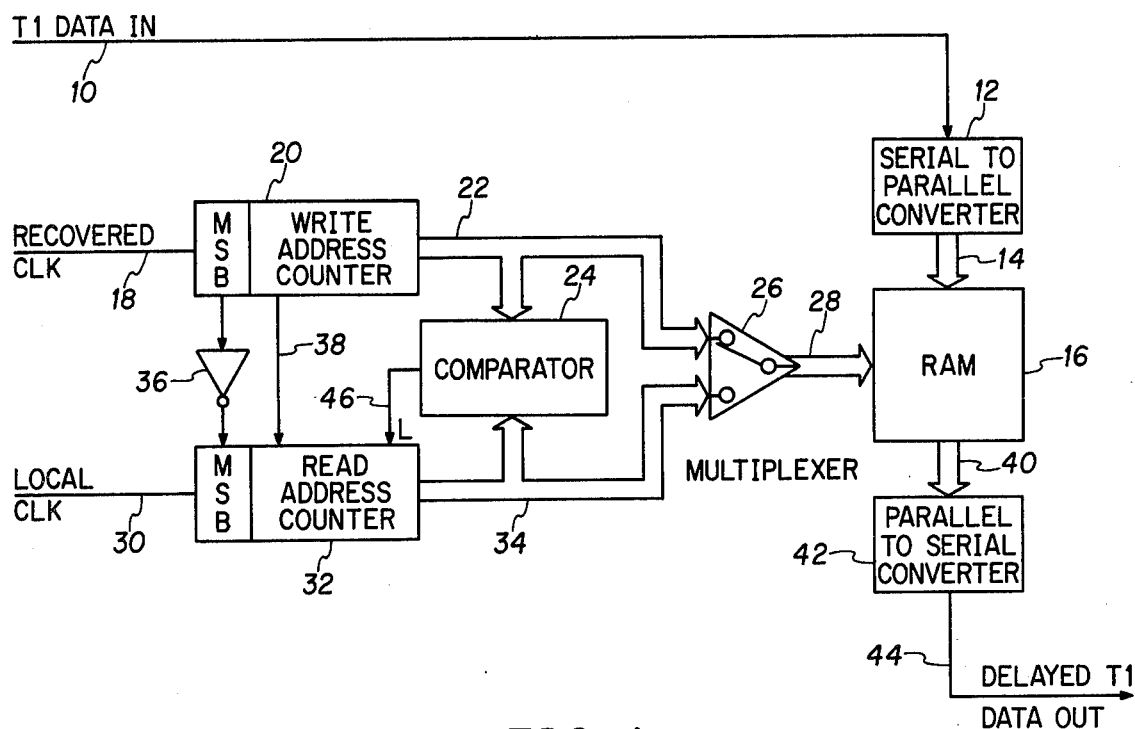
FIG. 1 is a simplified block diagram of one embodiment for practising the inventive concept.
Figure 3A:
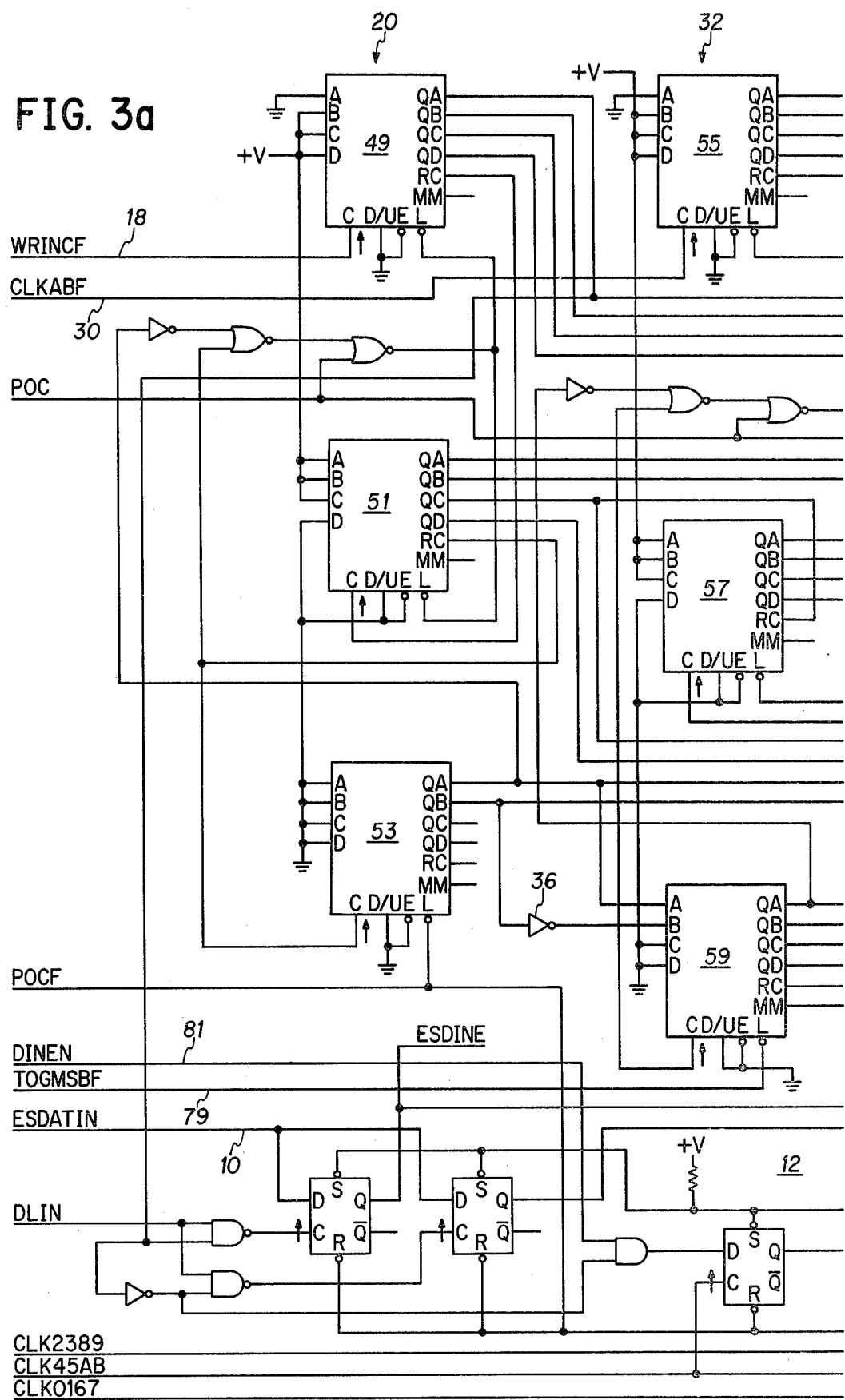
Figure 3B:
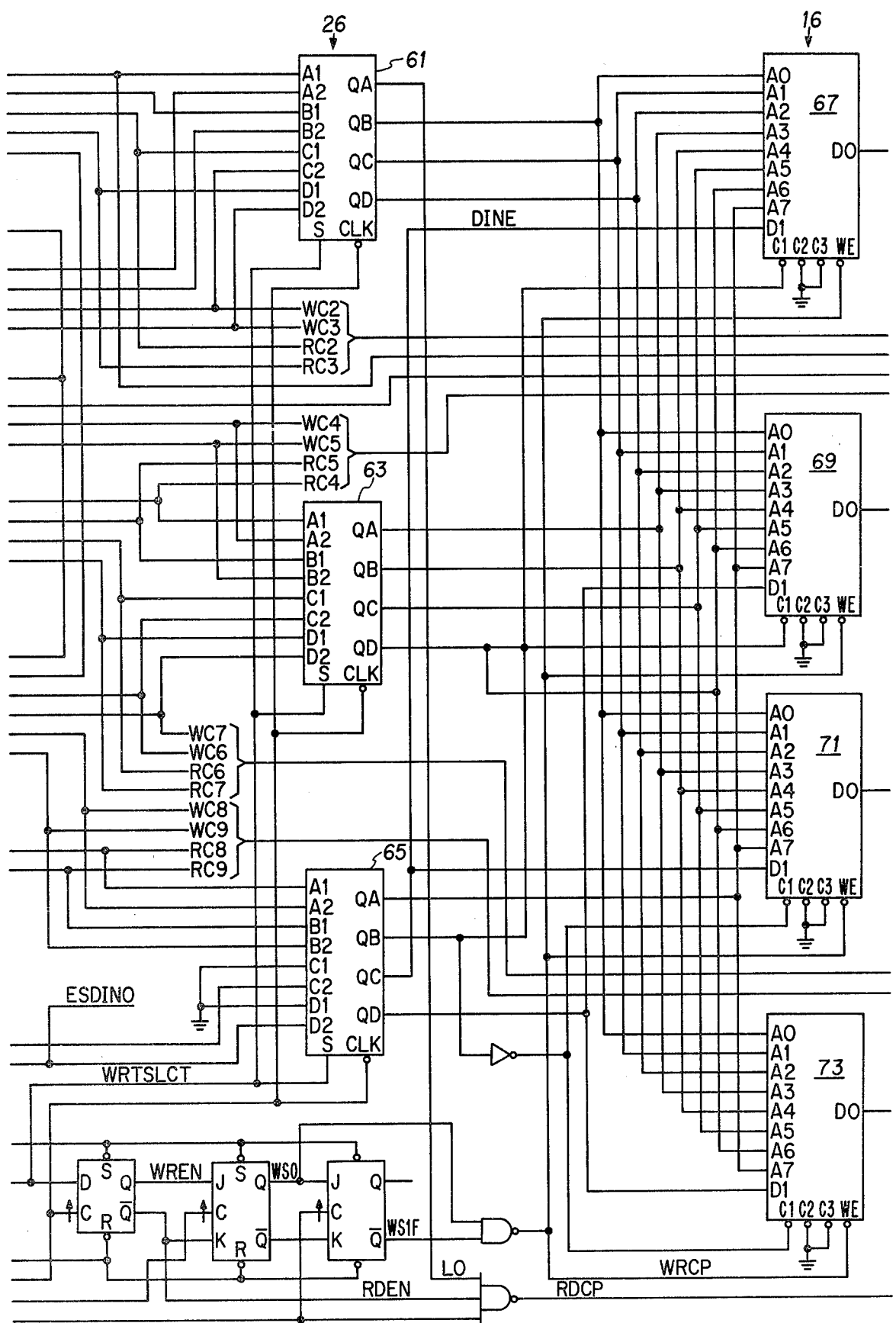
Figure 3C:
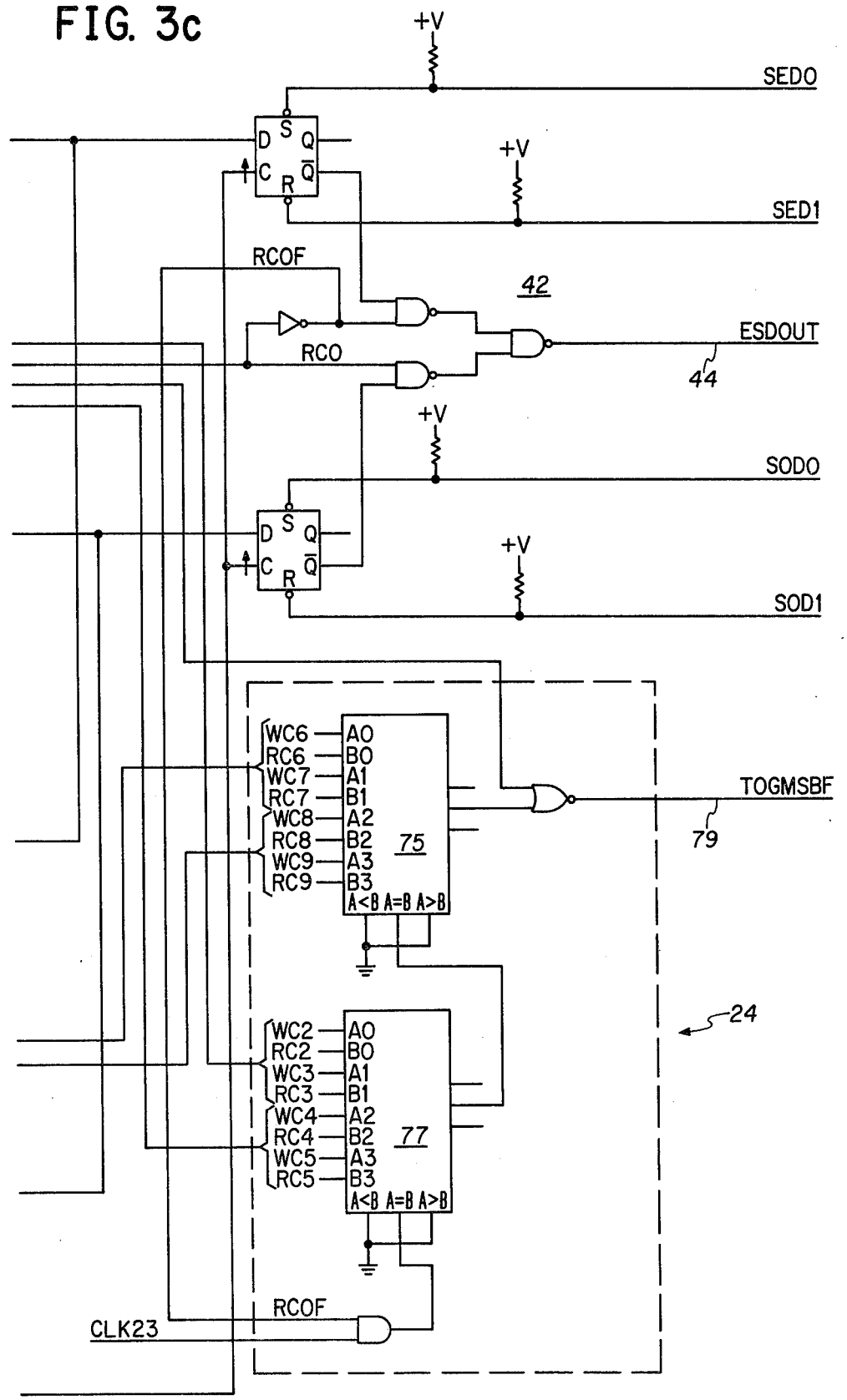
Figure 4:
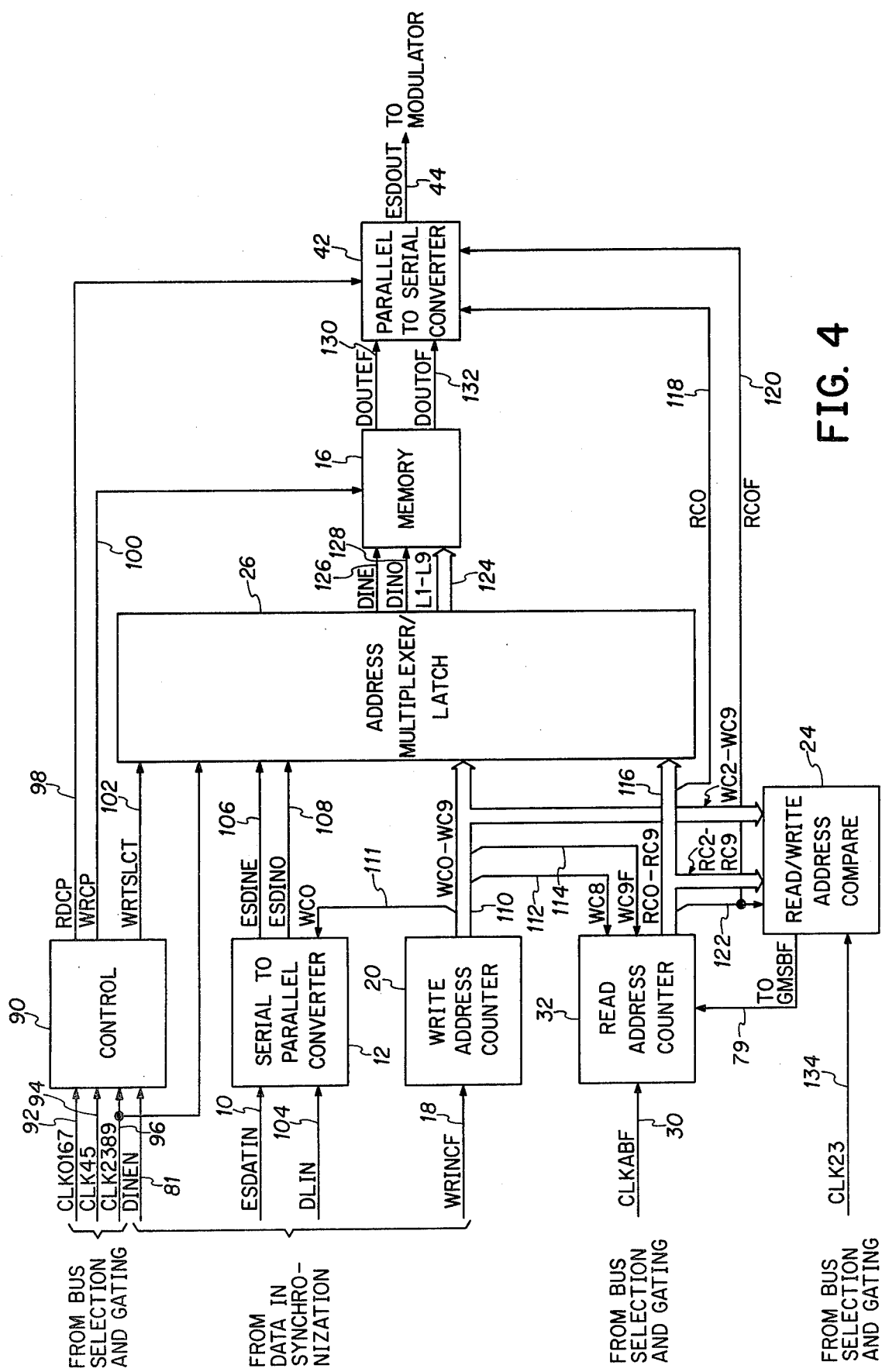
Figure 5:
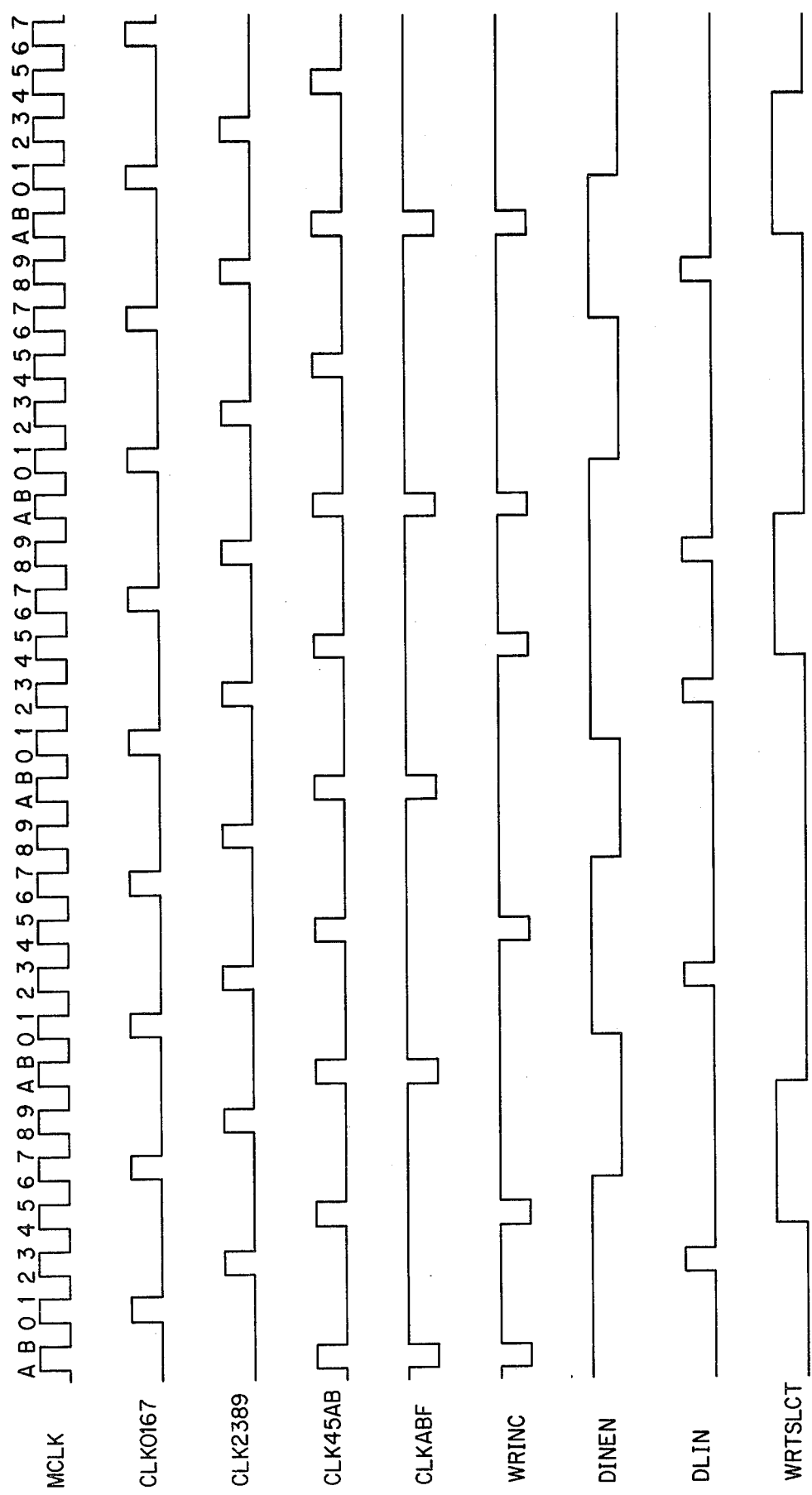
Figure 6:
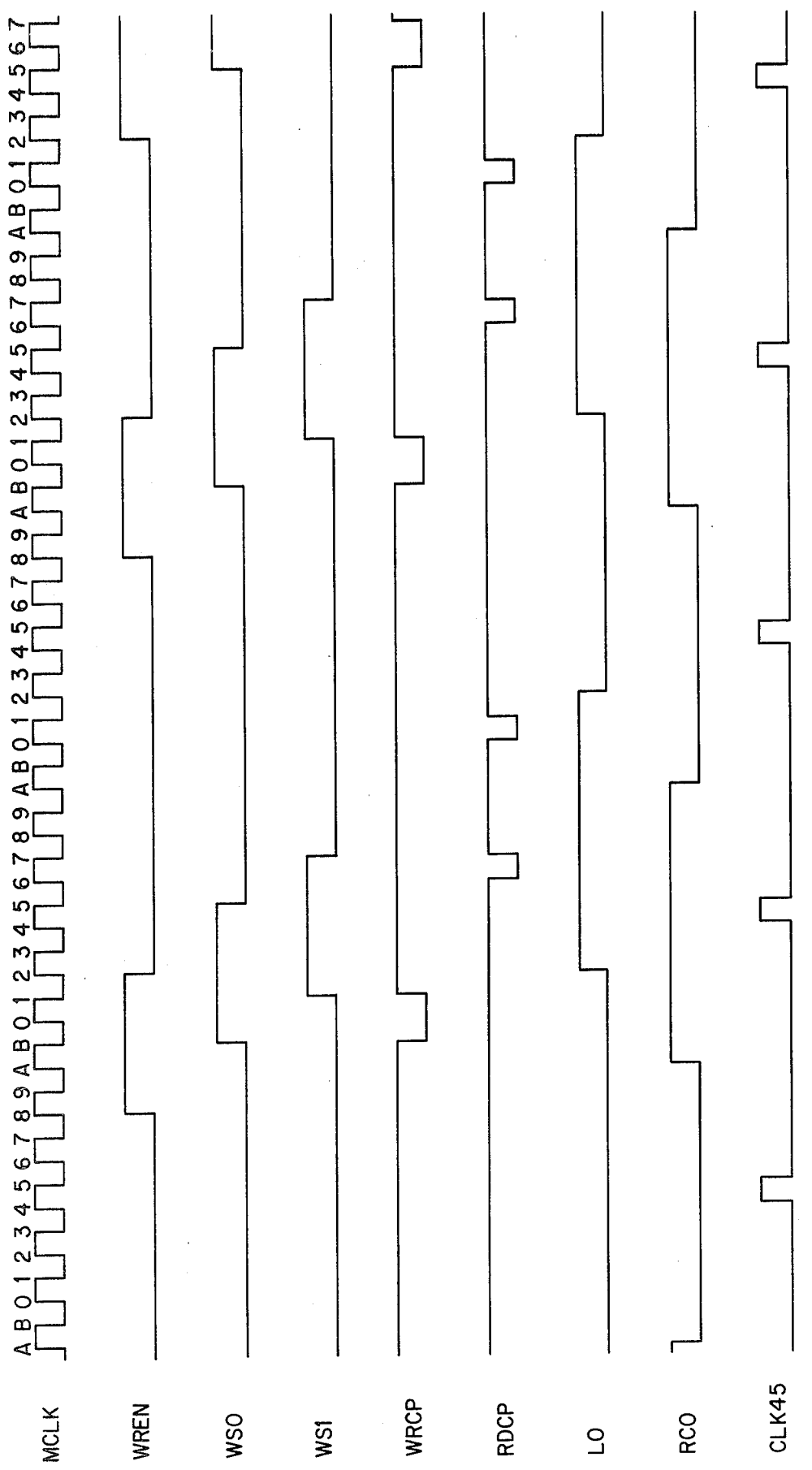
Figure 7:
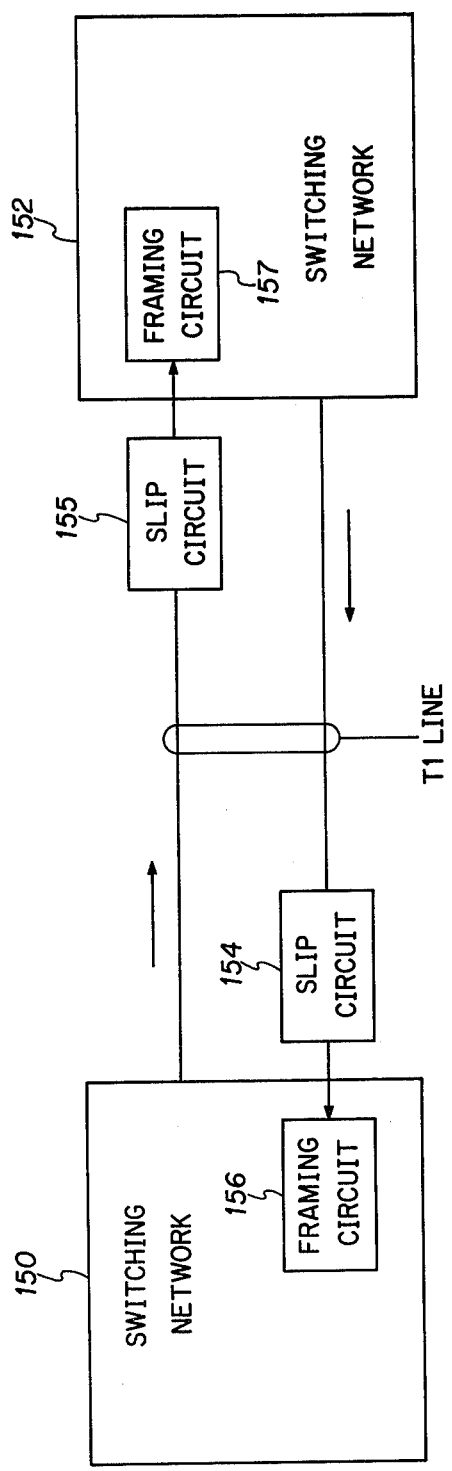
Figure 8:
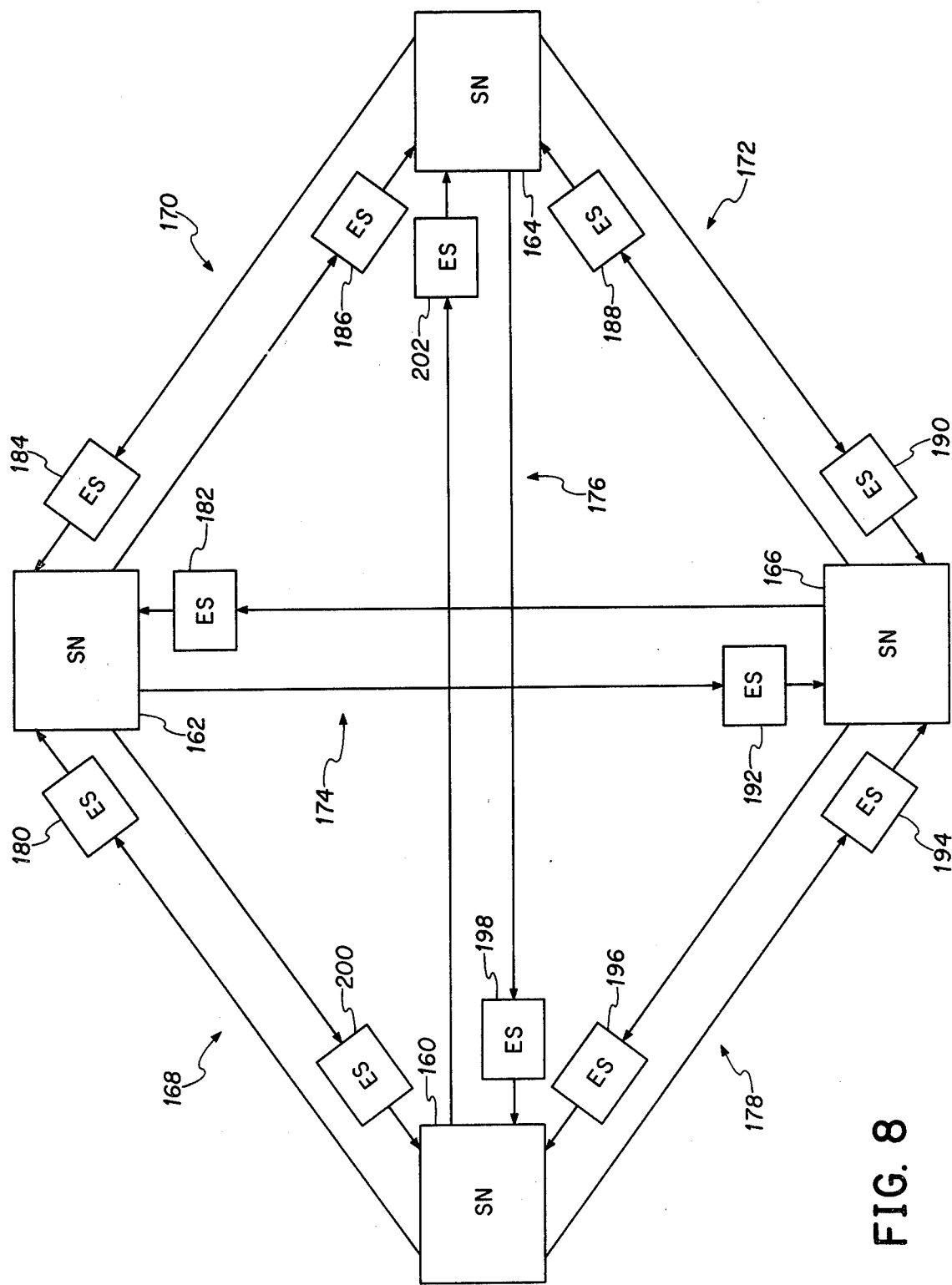

FIGS. 3a, 3b, and 3c comprise a detailed illustration of one embodiment of an inventive concept, illustrated by FIG. 1;

FIG. 4 is a more detailed block diagram illustrating generally the contents of FIGS. 3a, 3b and 3c;

FIGS. 5 and 6 are waveforms used in explaining the operation of the other figures; and FIGS. 7 and 8 illustrate uses of the inventive concept.

DETAILED DESCRIPTION

In FIG. 1 a lead 10 supplies input data from, as an example, a T1 carrier, to a serial to parallel converter 12 which supplies data in two bit parallel form on leads 14 to a random access memory or RAM 16. A recovered clock signal is supplied on a lead 18 to a write address counter 20. The recovered clock signal is obtained from the data being input on lead 10. The write address counter is shown broken up into two sections where the most significant bit is illustrated on the left and although not shown, the least significant bit would be furthest to the right. An output of address counter 20 appears on a set of leads 22 and is applied both to a comparator 24 and to a multiplexing switch 26. An output of multiplexer 26 appears on a plurality of leads 28 and is applied as an address input to RAM 16. A local clock signal is supplied on a lead 30 to a read address counter 32 configured in the same manner as the write address counter. A plurality of leads 34 from address counter 32 are applied to comparator 24 as well as to a second input of multiplexer 26. An inverter 36 is illustrated connected between the most significant bit positions of address counter 20 and read address counter 32. A further lead 38 is connected between the next to the most significant bit position of write address counter 20 and read address counter 32. The lead 38 is not significant to the invention but is illustrated merely because it was actually used in a constructed embodiment for convenience purposes. A set of leads 40 is connected between RAM 16 and a parallel to serial converter 42 which provides output data on lead 44. This is labeled delayed T1 data out because the device of FIG. 1 is used as an elastic store to resynchronize data from an incoming rate to a rate used by the local apparatus and as clocked by the signals appearing on clock lead 30. Finally, a lead 46 is connected from comparator 24 to an L (load) input of counter 32.

Figure 2:
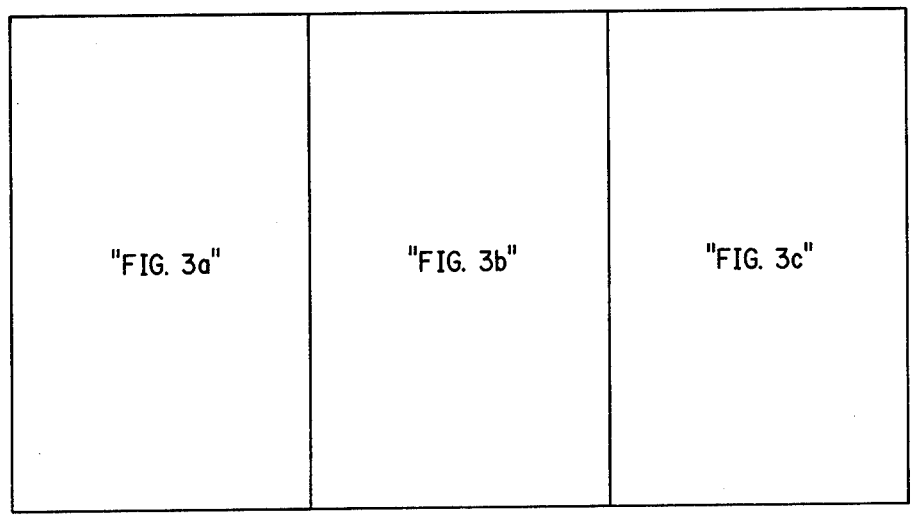
FIG. 2 is an illustration showing the arrangement of the detailed circuit diagram of FIG. 3.

As previously mentioned, FIG. 2 is merely an assembly drawing showing how the leads of the circuits in FIGS. 3a, 3b and 3c are connected.

In FIG. 3a a plurality of up/down counters 49, 51, and 53 are used for the write address counter illustrated as 20 in FIG. 1. These individual counter chips can be purchased under a manufacturer's part number 74LS191. A plurality of identical chips 55, 57, and 59 comprise the read address counter illustrated as 32 in FIG. 1. These counters are all connected in the count up mode. Three blocks 61, 63, and 65 in FIG. 3b provide the multiplexer/latch function of block 26 in FIG. 1. Each of these blocks has a part number of 74LS298. There are also four blocks 67, 69, 71, and 73 which form the RAM 16 of FIG. 1. Each of these blocks has a manufacturer's part number of 73LS201. A read/write address compare generally designated as 24 contains two chips 75 and 77 in FIG. 3c each of which has a manufacturer's part number of 74LS85. Although these types of parts to provide identical functions can be obtained from many different manufacturers, the ones used in this invention were from National Semiconductor Corporation. Referring back to FIG. 3a, it will be realized from an inspection that the uppermost leads from the two counters are the least significant bit while the most significant bits are taken from the lower blocks 53 and 59. Since only ten bits of information were required, only two bits were used from the lowermost counters. Most of the circuitry below the blocks 20, 32, and 26 in FIGS. 3a and 3b comprise the serial to parallel converter 12 while the circuitry in the upper righthand portion of FIG. 3c comprises the parallel to serial converter 42. Each of these blocks contains various D and J-K flip-flops as well as inverters and NAND gates and AND gates.

The line labeled ESDATIN is designated 10 since it provides the Elastic Store Data Input as illustrated in FIG. 1. The recovered clock signal 18 has the label WRINCF for write in clock false. A lead 30 is labeled CLKABF as clock A B false. This is synonymous with the local clock 30 of FIG. 1. A lead 79 is labeled TOGMSBF and is the same as that output from the comparator circuit 24 of FIG. 3c and is identical to lead 46 of FIG. 1. A lead 81 labeled DINEN is the Data Input Enable for timing purposes relative to the Elastic Store Data received on 10 which is converted to a 2 bit parallel format in converter 12. The rest of the signals can be determined as to timing and waveform from the illustrations in FIGS. 5 and 6.

In FIG. 4, a control block 90 is shown receiving clock signals on three leads; 92, 94 and 96 which are received from a bus selection and gating section of circuitry which need not be described since the waveforms are illustrated in other figures. A Read Clock Pulse is output from control 90 on lead 98 while a write clock pulse is output on lead 100. A Write Clock Select is output on lead 102. As shown lead 98 is connected to a parallel to serial converter previously shown as 42 while lead 100 is connected to memory or RAM previously shown as 16. Finally, lead 102 is connected to a multiplexer/latch previously shown as 26. The Data In Enable lead is labeled 81 as shown in FIG. 3a and is also applied to control 90. An elastic store data in lead 10 is shown connected to a serial to parallel converter previously designated as 12. An input clock is shown on lead 104 and is labeled DLIN. A recovered clock lead 18 is shown applied to the write address counter 20. The signals appearing on the last four leads 81, 10, 104 and 18 are obtained from data in synchronization on leads 81, 10, 104 and 18. Signals representative of Data In, Even and Odd, are shown respectively on leads 106 and 108 and are supplied from the converter 12 to the latch 26. The odd and even signals are representative for timing purposes of the first or second of the parallel bits to be output. As previously indicated the serial to parallel converter is a two bit serial to a two bit parallel converting device and thus even and odd are the terminology for the first and second of the two bits. An output of the write address counter is illustrated as a plurality of leads 110, applied to latch 26 with some of these leads being applied to the read/write address compare 24. A single lead illustrated as WC0 is designated as 111 and applied from write address counter 20 to the converter 12. The read address counter 32 receives the local phase clocks on lead 30 and also receives the eighth bit of write address counter output (WC8) on lead 112 and the inverted (or false) ninth bit (WC9F) on lead 114. Read counter 32 further receives gating or load signals on lead 79 (same as 46 in FIG. 1) from compare circuit 24. Read address counter 32 supplies a plurality of signals on leads 116 to latch 26 as well as supplying specific signals of RC0 on lead 118 to converter 42 and RC0 False on lead 120, both to compare circuit 24 and to converter 42. A further plurality of leads 122 from bundle 116 to compare circuit 24 contains the information in bit positions two through nine of counter 32. Bits one through nine of either of the counters 20 and 32 are output from latch 26 to memory 16 on a plurality of leads 124. It may be noted that the least significant or zero bit is not needed because the data is written two bits at a time in two separate memory sections of block 16 and thus the least significant bit is not required. Data signals on leads 126 and 128 are designated as DINE and DINO, meaning Data in Enable Even and Odd. Data Out Even False signals are supplied on lead 130 to converter 42 while Data Out Odd False signals are supplied on lead 132. The elastic store output signals are supplied on lead 44 to be used by switching or other equipment. Finally, clock signals illustrated as clock 23 are input to compare circuit 24 on a lead 134.

In understanding FIGS. 5 and 6, it must be first realized that the phases of the master clock are represented by the designations zero through nine and AB. Thereafter there is a repeat pattern. The signal clock 0167 will be understood as having a logic 1 condition occurring between the zero and one positions of the master clock and between the six and seven positions of the master clock and the remaining time being at a logic 0. Likewise, clock 2389 is logic 1 between positions two and three of the master and eight and nine of the master clock. If this signal had an "f" thereafter, thereby indicating it to be the false representation, these times would be the only times that the signal were a logic 0. Thus, the clocks 45, 45AB and ABF are self-explanatory. The recovered clock signal WRINCF is synchronous with the incoming data and it is shown closer together in two different sections in exaggerated amounts for clarity in subsequent discussions. The Data In Enable signal DINEN is responsive to and logically obtained from the incoming data and therefore is not synchronous with the master clock. The Data Load In signal DLIN is generated from the Data In Synchronization Circuitry and is a timing signal derived from the DINEN signal (logically the "and" of DINEN and CLK2389). The next signal is a Write Select signal which is applied on lead 102 to latch 26 and if the signal is a logic 1, data is written into the memory and if it is a logic 0, data is read from the memory and applied to the output 44. The next signal is Write/Read Enable and is a delayed version of the above signal. The following two signals, WS0 and WS1 are the Write State 0 and 1 and are delayed versions of the Write Enable signal used to generate the Write Clock Pulse shown on the following line, and as illustrated in the lower left-hand portion of FIG. 3b wherein two J-K flip-flops receive the WREN signal and output the WS0 and WSIF signals through a NAND gate. The Read Clock Pulses are shown next. This signal is generated from the Read Enable signal in conjunction with clock 0167 and the least significant bit (L0) from latch 26. Finally, an RC0 signal and a clock 45 signal are shown. The RC0 clock is the least significant bit of the read address counter and is used in the parallel to serial conversion.

In FIG. 7, a switching node 150 is sending information to and receiving information from a further switching node 152. Since the two switching nodes are physically separated, it may not be possible to keep both these networks at exactly the same clock frequency. Slip circuits 154 and 155 are used at the receiving end of the T-carrier line to reestablish timing and allow the two switching nodes to operate compatibly while transmitting data back-and-forth. Notice that framing circuits 156 and 157 are the first elements of the switching network. The use of the instant invention in slip circuits permits insertion and deletion of data without throwing the frame synchronization circuits out of synchronization, necessitating a reframe search.

As illustrated in FIG. 8, each link in a network is normally equipped as is the single link of FIG. 7.

As shown in FIG. 8 switching nodes 160, 162, 164 and 166 are connected together by various lines such as 168, 170, 172, 174, 176 and 178. Each line is equipped with an elastic storage mechanism, specific examples being 180, 182, 184, 186, 188, 190, 192, 194, 196, 198, and 200.

OPERATION

As previously indicated, and referring to FIG. 1, the data coming in on line 10 is converted to a two bit parallel form and inserted into the memory 16. The insertion occurs in a location of memory determined by signals received from write address counter 20 under the control of block 90 of FIG. 4 (not shown in FIG. 1). On the immediately subsequent time interval, period or slot, two parallel bits of data are read out of memory 16 into parallel to serial converter 42 in accordance with an address determined by counter 32 and also under control of block 90 of FIG. 4. These two bits are converted to serial form and are output on lead 44. The multiplexer 26 continually changes from transferring write address to transferring read addresses and back again. As an example, the data coming in may be written into data slot 16 and read from data slot 55. On the next pair of time slots, the next two bits of data would be read into space or slot 17 and read from slot or space 56. As long as the recovered and local clocks are synchronous, this spacing of 39 bits or number positions will remain constant. However, the recovered clock and the local clock are not normally synchronous and one will be faster than the other. Since the two clock signals on leads 18 and 30 are used to increment the counters 20 and 32, the counts, which go from zero to maximum and then "flop-over" and return to zero, will on occasion have the same count or address.

If for example the address in both counters is equivalent to a count of 16, and the local clock is slightly faster than the recovered clock, the data is read in to memory 16 on one time slot and read out on the immediately next time slot. When the devices are incremented, the next data will be read into space 17 and in all probability the data will be read out of space 17; however, at some point in time, the local clock will change the address in counter 32 enough in advance of counter 20 so that the data will be read out of memory 16 which was inserted one complete cycle earlier and thus, as an example, by the time the counters reach a count of 32, the data written in is written into a memory slot having an address of 32 while in the next time slot, the data is read out of position or slot 33.

This occasional change from current data to data which was received a complete memory capacity previously creates a disruption in data but is not as bad as another alternative of the two clocks "dithering" or changing in frequency such that at some times the local clock is reading the data most recently received and alternating between that and the data which was received a full cycle previously. This produces large amounts of errors and is intolerable in a data transmission system. As will be noted, the present system is a T1 data line elastic store apparatus and is being used as an alternative to the prior art approach of having a long register which is approximately half filled at the start and wherein data is clocked in by the recovered clock and read out by the local clock.

As will be realized from observing FIGS. 3a through 3c, all but the two least significant bits from counters 20 and 32 are applied to comparator 24. The comparator will provide an output on the gate lead 79 when there is a comparison. Since the least two significant bits are not compared, this comparison occurs when the two counts are in actuality one usable address count apart. The reason that it is not four counts apart is that the least significant bit is ignored in addressing the memory to compensate for the fact that there are parallel (odd and even) bits to be stored or read. In any event, the signal on gate 79 allows loading of an inverted form of the most significant bit from counter 20 to be inserted into counter 32 and thus produce a maximum alteration in the two address counts. For convenient minimization of circuitry, the next most significant bit is also applied to read address counter 59, but this bit logic value will be the same for each of the two numbers and thus the gate signal is not shown as activating this bit.

To summarize, the read and write operations are both sequential operations and are multiplexed to occur alternately and whenever the two addresses provided by the counters 20 and 32 approach each other, a comparator 24 activates a counter to alter its most significant bit so as to provide a step function alteration in the alternate accessing of memory 16.

Although this does produce an instantaneous error in the output data (not in sync signals) in either jumping ahead or back in the data being read out so that either some is omitted or some is repeated, this is preferable to a "dithering" of output data which could produce repeated errors over a long period of time and cause synchronization problems in equipment connected to receive signals from line 44. Thus the present invention adjusts one of the addresses by two complete frames of information to maintain industry standard format synchronization pulse signals.

In view of the above information, it is believed that FIGS. 3a through 3c are fairly self-explanatory wherein the Write In Clock False signals on lead 18 are received by the clock input of counter chip 49 and whenever this counter overflows, outputs are provided on output RC to the clock input of counter chip 51. When this overflows it activates the clock input of counter 53 so as to provide the total counter operation indicated as 20 in FIG. 1. A similar result is provided by the selections of counter 32 of FIG. 3a with the input clock pulse being received in lead 30. It will be noted that an inverter 36 is connected between the most significant bit position of portion 53 of counter 20 to portion 59 of counter 32. In addition, the next most significant bit positions are also connected together. Although this data is always applied to inputs A and B, it is only accepted by logic circuit 59 when an input signal is received on lead 79 to the load input of block 59. A Write Select signal WRTSLCT is obtained from the D flip-flop which is actuated by a combination of the Data In Enable signals and the least significant bit of counter 20. As mentioned previously, a logic 1 on this lead allows writing of data into memory and a logic 0 provides for reading from the memory. This signal on the S inputs of blocks 61, 63 and 65 determines which of the signals appearing on the A through D inputs of these blocks obtained from counters 20 and 32 will be passed through to the memory blocks 16. Logic circuitry comprising two J-K flip-flops immediately beneath block 65 receives a Write Enable signal and produces the Write State Zero and Write State One signals used in conjunction with a NAND gate to produce the Write Clock Pulses applied to the WE (Write Enable) inputs of blocks 16. These memory blocks are arranged such that the data is written into only two of the blocks in parallel at a time or read from only two of the blocks at a time. This information is output of the two D flip-flops on FIG. 3c and is clocked out under the control of either RC0 or RC0F from these D flip-flops to output lead 44. The addresses obtained from the counters are supplied to the two comparator circuits 75 and 77 which, when bit positions two through nine compare, provide an output on lead 79 to activate the load input of counter block 59. As illustrated, the least significant bit of counter 32 is obtained from multiplex/latch 26 to generate the Read Clock Pulse and this same waveform signal is also directly obtained from counter 32 to produce the RC0 pulse.

In view of the above explanations of FIGS. 1 and 3a through 3c, it is believed that further explanation of FIG. 4, which merely draws together the detailed circuit diagrams of FIG. 3, is unnecessary.

As explained supra, the inventive concept is in the use of an elastic store which, when slippage of data bits is required, slips the data bits by an integral number of frames. When this type of slippage is provided, there is no interruption of the receipt of framing bits and, thus, there is no requirement for the normally required frame sync circuit in the elastic store network. With the specific embodiment illustrated, the receiving apparatus must tolerate a one logic bit error in the received framing signals to continue operating properly. However, if the receiving equipment is not capable of tolerating a one framing bit error, the apparatus can be redesigned by expanding the size of the RAM so that four frames are slipped rather than two frames. Then, there will not even be any errors in the received framing bits and the only loss will be a very seldom occurring incidence of four frames of data bits lost. As long as these data bits are indicative of voice and thus occur in voice channels, there is not enough loss of information so that it is even very noticeable on the telephone line. In the case of data, the data can be retransmitted in the area where it does not make sense. However, the erroneous transmittal of information due to the slippage would be a very rare thing unless there were severe problems in other parts of the network.

While a single embodiment of the inventive concept has been described, it is not the only way of implementing the inventive concept and thus I wish to be limited only by the scope of the appended claims wherein the invention is claimed.

What is claimed is:

1. Elastic storage apparatus for connecting data lines together comprising, in combination:
   first means for receiving input data including a periodically occurring framing indicator;
   second means for outputting data after a variable delay;
   elastic store means, connected between said first and said second means, for variably time delaying data from input to output between predetermined limits;
   write address means;
   read address means;
   mutiplex means, connected between said read and said write address means and said elastic store means, for multiplexing read and write addresses to said store means such that data is written into an addressed area in said store means and then other data is read out of an addressed area in said store means before a write operation is repeated; and
   means, connected to said multiplex means, for detecting the approach to said predetermined limits of the time delay and for readjusting the addresses and thus the time delay in the store means by a time equivalent to the passage of an amount of data equal to the period of the framing indicator.

2. The apparatus of claim 1 operating on D2 format PCM, wherein the period of the framing indicator is 722 bits.

3. The apparatus of claim 1 for use on D1 format PCM, in which the period of the framing indicator is 386 bits.

4. Elastic storage apparatus for synchronizing data transmissions between two T-carrier format communication links without the need for input signals from a frame synchronization circuit comprising, in combination:
   elastic store means, including data input means, data output means, for adjustably time delaying data traversal between said data input means and said data output means between predetermined limits;
   first means for supplying a recovered clock signal having a periodicity in accordance with incoming data bits;
   second means for supplying a local clock signal which is nonsynchronous with the recovered clock signal;
   multiplex means for supplying multiplexed read and write addresses to said store means for effecting data input thereto and data output therefrom; and
   detection means, connected to said multiplex means for readjusting the time delay of data bit traversal through said elastic store means by an amount equivalent to the local rate of an even number of frames of data bits.

5. Apparatus as claimed in claim 4 wherein the time delay readjustment is equivalent to two frames.

6. Elastic storage apparatus for connecting data lines together, which utilize a single bit framing indicator which alternates in logic value from frame to frame and thus has a two frame period, comprising in combination:
   first means for receiving input data including a periodically occurring indicator;
   second means for outputting data after a variable delay;
   elastic store means, connected between said first and said second means, for variably time delaying data from input to output between predetermined limits;
   read and write address multiplex means, connected to said store means, for determining the variable delay occasioned within said store means in accordance with clocks derived from received data and a local clock; and
   means, connected to said multiplex means, for detecting the approach to said predetermined limits of the time delay and for readjusting the time delay, by adjusting one of the read and write addresses, by a time equivalent to the passage of an amount of data equal to one-half the period of the framing indicator.

7. The apparatus of claim 6 used with D2 format T-carrier in which the amount of data inserted or deleted is 386 bits.

8. The apparatus of claim 6 used with D1 format T-carrier in which the amount of data inserted or deleted is 193 bits.

9. The method of maintaining synchronization by means of a read-write address multiplexed elastic storage device in a T-carrier type communication channel without the need for synchronization hardware comprising, the steps of:
   writing incoming data to a memory;
   reading output data from the memory;
   detecting when read and write operations are close enough in the memory to potentially cause problems; and
   slipping one of the read and write operations with respect to the other by an amount equivalent to an integral number of frames of data when detection of potential problems occurs.

10. The method of maintaining synchronization in a T-carrier communication link without the need for a frame synchronization circuit as part of the synchronization apparatus comprising the steps of:
   storing data in a random access memory using multiplexed recovered clock write and local clock read operations for an elastic delay; and
   slipping the read operation in memory with respect to the write operation by an integral number of frames when slippage is required.

11. Apparatus for maintaining synchronization in a T-carrier elastic store circuit without the requirement for a frame synchronization circuit being included comprising, in combination:
   memory means;
   means for storing data in said memory means using multiplexed read and write operations therein for an elastic delay; and
   means, connected to said memory means, for slipping the read and write operations in memory with respect to one another by an integral number of frame bits when slippage is required.

* * * * *